April 22, 1930.  W. H. T. HOLDEN  1,755,258
BATTERY CHARGING CIRCUITS
Filed April 12, 1929
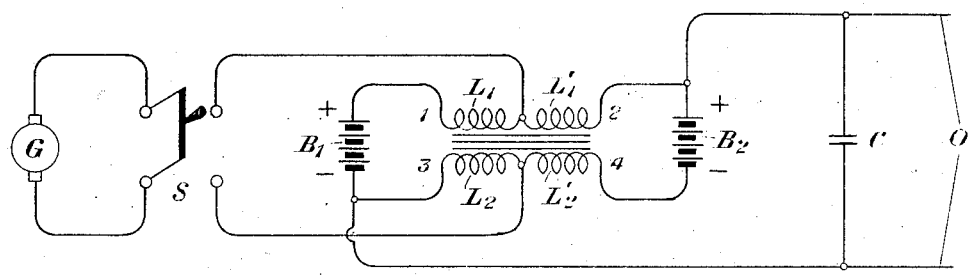
INVENTOR
W. H. T. Holden
BY
ATTORNEY Patented Apr. 22, 1930

1,755,258

UNITED STATES PATENT OFFICE

WILLIAM H. T. HOLDEN, OF BROOKLYN, NEW YORK, ASSIGNOR TO AMERICAN TELEPHONE AND TELEGRAPH COMPANY, A CORPORATION OF NEW YORK

BATTERY-CHARGING CIRCUITS

Application filed April 12, 1929. Serial No. 354,607.

This invention relates to electrical circuits, and particularly to such circuits as are employed in the charging of storage batteries, or the like.

One of the objects of this invention is to provide an arrangement for substantially reducing the alternating current components emitted by a direct current charging generator or from a rectifier associated with an alternating current generator, or the like, so that an output circuit coupled to the charging circuit will be free from noise.

Another of the objects of this invention is to interpose between a source of direct current and a circuit to which the current from the source is to be supplied, an arrangement which will act like an electrical wave filter and which will be capable of suppressing currents of all frequencies, high or low.

While this invention will be pointed out with particularity in the appended claims, the invention itself, both as to its further objects and features, will be better understood from the detailed description hereinafter following, when read in connection with the accompanying drawing showing one embodiment of the invention merely for the purpose of illustration.

Referring to the drawing, there will be found a transformer of the iron core type having primary and secondary windings, and these windings preferably have the same number of turns, the same resistance and the same reactance. The transformer is thus a unit ratio device. For the sake of clarity in description, the primary will be considered divided into two equal portions designated $L_1$ and $L_1'$, and the secondary into two similar portions designated $L_2$ and $L_2'$, but it is to be understood that the primary as well as the secondary may be a complete winding and that the two equal portions may be obtained by tapping each winding at its midpoint.

Two storage batteries are designated $B_1$ and $B_2$, and these have the same number of cells. Of course, the terminal voltages of these batteries will be substantially the same. Their internal resistance will also be substantially the same and indeed of very small magnitude, and may, for practical purposes, be considered negligible.

A generator is designated G, and this is capable of producing direct current of substantially constant voltage. This generator may also produce alternating current components known as ripples, which, if transmitted through the associated circuits, result in noise. It is to be understood that this generator may be replaced by any other source of direct current, preferably of substantially constant voltage, and that it may, if desired, be replaced by a source of alternating current coupled electromagnetically to a rectifier of any well-known type.

A double pole, single throw switch is designated S, and this is employed for the purpose of connecting the generator G to the midpoints of the primary and secondary windings of the transformer, which are in effect the points common to the windings $L_1$ and $L_1'$ and the windings $L_2$ and $L_2'$. When switch S is closed, the generator G is connected in series with the circuit including winding $L_1$, battery $B_1$ and winding $L_2$, and in series, also, with another circuit including winding $L_1'$, battery $B_2$ and winding $L_2'$. It is to be noted that the windings $L_1$ and $L_1'$ are connected between the positive terminals of batteries $B_1$ and $B_2$ and that windings $L_2$ and $L_2'$ are connected between the negative terminals of these batteries. An output circuit, designated O, is connected to the negative terminal of battery $B_1$ and to the positive terminal of battery $B_2$ and this output circuit is shunted by a condenser designated C.

Each alternating current component transmitted by the source G flows over both of the series circuits above described and, since these circuits have the same impedance, the voltage of each component effective across the terminals of winding $L_1$ is the same as that across the terminals of winding $L_1'$. Also, the voltage of each such component impressed across the terminals of winding $L_2$ is the same as that impressed across the terminals of winding $L_2'$. But the current which flows through winding $L_1$ will be opposite in direction to that which flows in winding $L_1'$, and that which flows through winding $L_2$ will be opposite in direction to that flowing through winding $L_2'$. Since the current flowing through winding $L_1$ is equal and opposite to that flowing through winding $L_1'$, there will be no effective voltage across the outer terminals of the primary windings designated 1 and 2. For a similar reason, there will be no effective voltage across the outer terminals, designated 3 and 4, of the secondary windings as a result of the flow of alternating current from generator G.

The current which flows from generator G through the primary and secondary windings to the batteries $B_1$ and $B_2$ is said to trickle into these batteries. The trickle current is ordinarily steady and tends to produce a flux about the primary and secondary windings of the transformer and in its iron core and further tends to saturate the iron core. By virtue of the equality of the impedances of the primary and secondary windings, the fluxes produced by $L_1$, $L_1'$, $L_2$ and $L_2'$ are all equal. But the flux produced by the winding $L_1$ is opposite to that produced by winding $L_1'$, and, moreover, that produced by winding $L_2$ is opposite to that produced by winding $L_2'$. Accordingly, the fluxes produced by windings $L_1$ and $L_1'$, as well as those produced by $L_2$ and $L_2'$, balance each other. Thus, the iron core of the transformer will not tend to become saturated as a result of the flow of trickle current.

The circuit arrangement shown in the drawing is in the form of a Wheatstone bridge. One of the arms of this bridge is formed by winding $L_1'$, another by winding $L_2$, a third, by winding $L_1$ and battery $B_1$, and a fourth, by winding $L_2'$ and battery $B_2$. When the switch S is closed, the generator G forms one diagonal of the bridge, and the output circuit O shunted by condenser C represents the other diagonal. The batteries may be considered to have substantially zero resistance. It will be apparent that it is the object of this invention to prevent alternating current components emanating from generator G from being transmitted and applied to the output circuit O and from producing noise therein.

It has been stated hereinabove that the voltage of each alternating current produced across winding $L_1$ is equal and opposite to that produced across winding $L_1'$ and that therefore practically no current of any frequency will be impressed across the outer terminals 1 and 2 of the primary windings. If a detecting circuit consisting, for example, of a telephone head set and a condenser in series relationship were bridged across terminals 1 and 2, there would be no indication of the flow of alternating current. Since battery $B_1$ has a negligible impedance, this detecting circuit might also be bridged between the point 2 and the negative terminal of battery $B_1$, and still the detecting circuit would indicate that no alternating current was flowing. Since the circuit including winding $L_2$, winding $L_2'$ and battery $B_2$ is one substantially the same as the circuit including battery $B_1$, winding $L_1$ and winding $L_1'$, the former circuit will also prevent the transmission of alternating current components. It will then be apparent that the output circuit O may be supplied with current from generator G substantially free from alternating current components and circuit O will, consequently, be free from noise.

Batteries $B_1$ and $B_2$ may be considered to float on the circuit arrangement interconnecting generator G and the output circuit O. Whenever the voltage of generator G is greater than the terminal voltages of batteries $B_1$ and $B_2$, current will trickle from generator G into these batteries to cause their charge. Whenever the voltage of generator G is substantially the same as the terminal voltages of batteries $B_1$ and $B_2$, there will be practically no flow of current from generator G into these batteries. Throughout the floating condition, current passes from generator G through windings $L_1'$ and $L_2$ to the output circuit O. Since the current flowing through windings $L_1'$ and $L_2$ is direct, each of these windings will tend to produce a steady flux which will also tend to saturate the iron core of the transformer. The fluxes generated by windings $L_1'$ and $L_2$ will be of equal magnitude and of opposite direction with respect to the iron core, and these will therefore balance each other and prevent the saturation of the core.

When switch S is opened, generator G is disconnected from the output circuit O and batteries $B_1$ and $B_2$ will supply the output circuit with current. Battery $B_1$ will send current through windings $L_1$ and $L_1'$, and battery $B_2$ will send current through windings $L_2$ and $L_2'$. The fluxes established by windings $L_1$ and $L_1'$ will be in the same direction and additive in effect, and those established by windings $L_2$ and $L_2'$ will also be additive but will be in a direction opposite to those established by windings $L_1$ and $L_1'$. The total flux produced by windings $L_1$ and $L_1'$ will be substantially equal and opposite to that produced by windings $L_2$ and $L_2'$, and therefore the resultant flux in the iron core of the transformer will be substantially zero, and there will be no saturation effects.

The circuit arrangement shown in the drawing represents a filter for substantially reducing or eliminating all alternating current components emanating from the direct current source. In other words, the filter has no cut-off point. Both high and low frequencies are substantially suppressed, the higher frequencies being suppressed to a greater extent than the lower frequencies. Therefore, the arrangement is effective in preventing disturbances due to telegraphic signals from affecting the circuits associated with the output circuit O.

Condenser C is one of large capacity and, as has been stated hereinabove, it bridges the output circuit O. When looking from circuit O at generator G through the transformer arrangement of the invention, a reactance will be seen, whose value is determined by the resultant of the inductances of windings $L_1$ and $L_1'$ in series, in parallel aiding with those of windings $L_2$ and $L_2'$ in series. Thus, the arrangement seen from circuit O has approximately the inductances of the windings $L_1$ and $L_1'$ or windings $L_2$ and $L_2'$. Where the circuits coupled to output circuit O are of such a nature that a common impedance will cause interaction therebetween, resulting in cross-talk or cross-fire, in the case of telephone or telegraph circuits, respectively, it is necessary to provide condenser C to eliminate this common impedance.

While this invention has been disclosed in a certain particular arrangement, merely for the purpose of illustration, it is to be understood that the general principles of this invention may be applied to other and widely varied organizations without departing from the spirit of the invention and the scope of the appended claims.

What is claimed is:

1. The combination of two storage batteries of equal terminal voltages, a transformer having two equal windings, one connected between the positive terminals of both batteries and another connected between the negative terminals of the batteries, and a source of direct current connected to the midpoints of both windings of the transformer.

2. The combination of two storage batteries of equal terminal voltages, a transformer having two windings of the same number of turns and both placed about an iron core, one of the windings of the transformer interconnecting the positive terminals of the batteries, the other of the windings of the transformer interconnecting the negative terminals of the batteries, a direct current generator connected to the midpoints of the transformer windings, an output circuit connected between the negative terminal of one of the batteries and the positive terminal of the other of the batteries, and a condenser of large capacity in shunt with the output circuit.

3. A Wheatstone bridge arrangement including the combination of an iron core transformer having two windings having the same number of turns and of the same impedance, two storage batteries having equal terminal voltages, a source of direct current, and an output circuit, one-half of each of the windings forming two of the arms of the Wheatstone bridge, the other half of each of the windings and each of the storage batteries forming one of the other arms of the bridge, the source of direct current being connected as one diagonal of the bridge and the output circuit being connected as its other diagonal.

In testimony whereof, I have signed my name to this specification this 11th day of April, 1929.

WILLIAM H. T. HOLDEN.